US012724616B2

(12) United States Patent
Chen et al.

(10) Patent No.: US 12,724,616 B2
(45) Date of Patent: Sep. 1, 2026

(54) SYSTEM AND METHOD FOR RESETTING COMPUTING DEVICES

(71) Applicant: Future Dial, Inc., Sunnyvale, CA (US)

(72) Inventors: Chen Chen, San Ramon, CA (US); Yueting Zhang, San Jose, CA (US); Jisheng Li, Los Altos, CA (US)

(73) Assignee: Future Dial, Inc., Sunnyvale, CA (US)

( * ) Notice: Subject to any disclaimer, the term of this patent is extended or adjusted under 35 U.S.C. 154(b) by 102 days.

(21) Appl. No.: 18/340,498

(22) Filed: Jun. 23, 2023

(65) Prior Publication Data

US 2024/0427608 A1 Dec. 26, 2024

(51) Int. Cl.
*G06F 9/44* (2018.01)
*G06F 9/4401* (2018.01)
*H04B 5/00* (2006.01)

(52) U.S. Cl.
CPC .............. *G06F 9/4401* (2013.01); *H04B 5/00* (2013.01)

(58) Field of Classification Search
CPC ................................ G06F 9/4401; H04B 5/00
See application file for complete search history.

(56) References Cited

U.S. PATENT DOCUMENTS 9,003,185 B2 * 4/2015 Chang ................... H04L 63/083 713/166
9,208,242 B2 * 12/2015 Kindberg ........... G06K 7/10475
10,860,968 B1 * 12/2020 Iacono ................. G06Q 10/083
2009/0024837 A1 * 1/2009 Brand ..................... G06F 9/454 712/214
2017/0317720 A1 * 11/2017 Turner ..................... H04B 5/20
2018/0096174 A1 * 4/2018 Finger ................... G06F 21/629
2018/0330115 A1 * 11/2018 Felton ................... H04W 12/02
2019/0212942 A1 * 7/2019 Kellokoski ........... G06F 3/0623
2020/0134778 A1 * 4/2020 He ......................... G06V 10/82
2020/0137070 A1 * 4/2020 Bhattacharya .......... H04L 67/55
2021/0014110 A1 * 1/2021 Comerica ............... H04L 12/12
2021/0089107 A1 * 3/2021 Maita .................... B62B 3/1424
2021/0325948 A1 * 10/2021 Lee ....................... G06F 3/0632
2022/0191663 A1 * 6/2022 Karpoor .................. H04L 43/50
2024/0118887 A1 * 4/2024 Oh ........................... G06F 8/65
2024/0195830 A1 * 6/2024 Jayaraman .......... H04L 63/1433

FOREIGN PATENT DOCUMENTS

CN 103442009 * 8/2013
CN 103442009 A * 12/2013

* cited by examiner

*Primary Examiner* — Zahid Choudhury
(74) *Attorney, Agent, or Firm* — Greenberg Traurig

(57) ABSTRACT

A system may receive a request for a reset file from a mobile computing device over the network. A system may output the reset file to the mobile computing device, wherein the reset file is in an Android Package Kit file format. A system may receive device information from the mobile computing device. A system may store the device information as received in a transaction log database.

20 Claims, 4 Drawing Sheets

SYSTEM AND METHOD FOR RESETTING COMPUTING DEVICES

FIELD OF THE TECHNOLOGY

At least some embodiments disclosed herein relate generally to mobile computing devices. More specifically, at least some embodiments relate to systems and methods for resetting a mobile computing device.

BACKGROUND

Mobile computing devices can be returned and refurbished for resale. Part of the process can include resetting the mobile computing device to clear user-specific data. Typically, this process is performed by connecting the mobile computing devices to a personal computer or other station.

BRIEF DESCRIPTION OF THE DRAWINGS

References are made to the accompanying drawings that form a part of this disclosure and illustrate embodiments in which systems and methods described in this Specification can be practiced.

Like reference numbers represent the same or similar parts throughout.

DETAILED DESCRIPTION

Mobile computing devices such as, but not limited to, smartphones, tablets, laptops, smartwatches, and the like, can be returned and refurbished for resale. Part of the refurbishment process can include resetting the mobile computing device to remove any user-stored data and information. Often, this process includes connecting a mobile computing device to a test station (e.g., a computing device) that communicates with the mobile computing deice to accomplish the resetting process. In some instances, the test station can have a limited number of connections. In some instances, this can cause a bottleneck in the refurbishment process. In some instances, if the test station is down for any reason, the process can be stopped.

Embodiments of this disclosure are directed to systems and methods for performing the resetting process without requiring a hardwired connection to a test station. In some embodiments, the mobile computing devices can connect via a network to a server or other computing device to communicate and retrieve appropriate files for completing the reset process. In some embodiments, the server or other computing device can be located on site in a similar manner to having a test station on site. In some embodiments, the server or other computing device can be located physically away from the refurbishment site.

Figure 1:
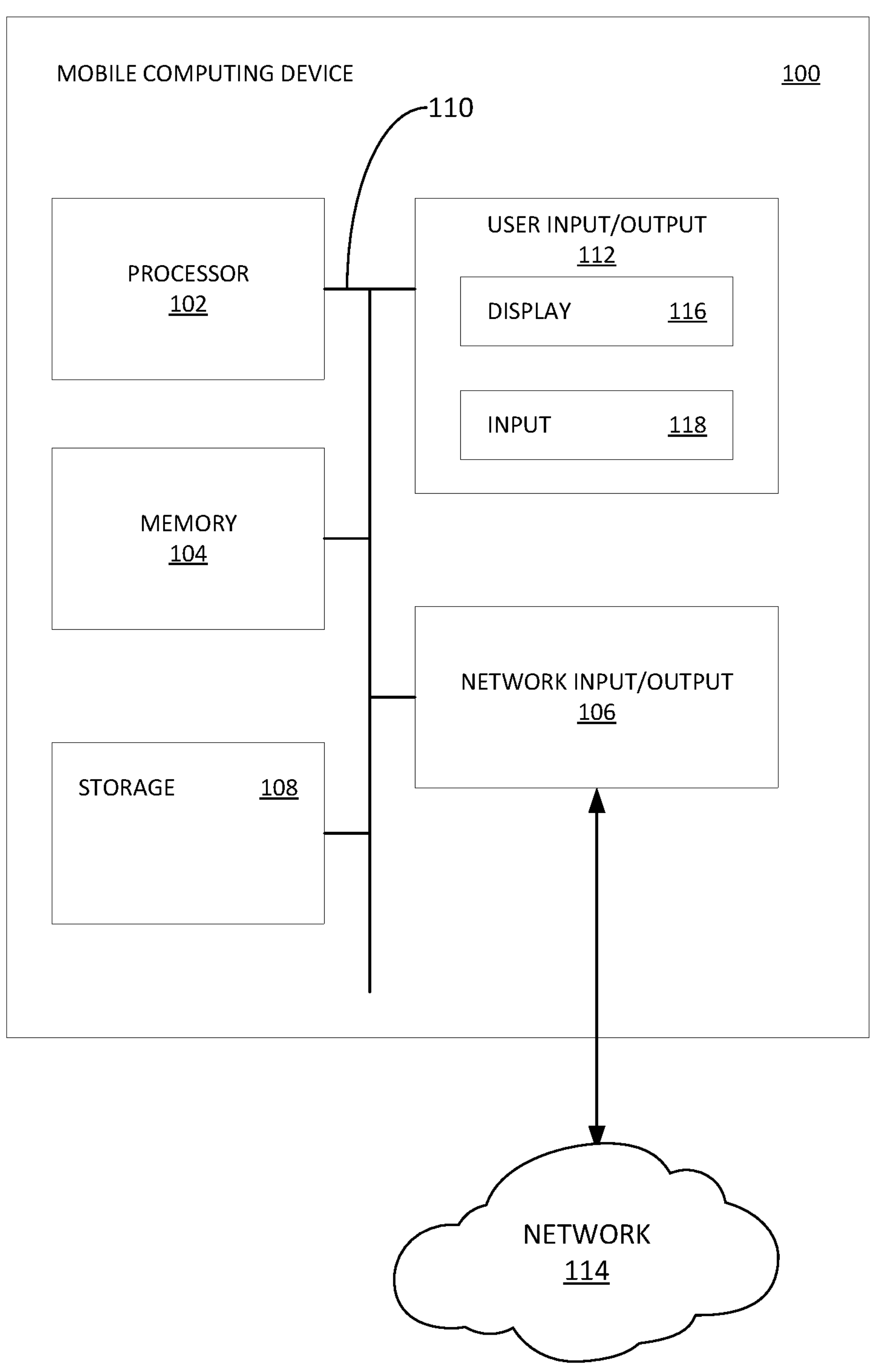
FIG. 1 shows a mobile computing device, according to some embodiments.

FIG. 1 shows a mobile computing device 100, according to some embodiments. The mobile computing device 100 and any of the individual components thereof can be used for any of the operations described in accordance with any of the methods described herein.

The mobile computing device 100 includes a processor 102, a memory 104, a network input/output (I/O) 106, a storage 108, an interconnect 110, and a user input/output 112. The mobile computing device 100 can be in communication with one or more additional computing devices through a network 114.

The mobile computing device 100 can be representative of a mobile computing device such as, but not limited to, a cellular phone, a tablet, a smartwatch, a personal digital assistant (PDA), a video game console, a television, or the like. The mobile computing device 100 can be in communication with another computing device (e.g., a server device) through the network 114. The computing devices 100 in communication can be different types of devices. For example, in an embodiment, a server device (FIG. 2) can be connected in communication with the mobile computing device 100 via the network 114.

The processor 102 can retrieve and execute programming instructions that are stored in the memory 104, the storage 108, or combinations of the memory 104 and the storage 108. For example, the storage 108 can include an application 116. The application 116 can, when executed, cause the processor 102 to perform a method (FIG. 3) to reset the mobile computing device 100. The processor 102 can also store and retrieve application data residing in the memory 104. The interconnect 110 transmits programming instructions, application data, or combinations thereof, between the processor 102, the user I/O 112, the memory 104, the storage 108, and the network I/O 106. The interconnect 110 can be one or more busses or the like. The processor 102 can be a single processor, multiple processors, or a single processor having multiple processing cores. In an embodiment, the processor 102 is a single-threaded processor. In an embodiment, the processor 102 is a multi-threaded processor.

The user I/O 112 includes a display 118 and an input 1104. In some embodiments, the display 118 and the input 1104 are combined (e.g., a touchscreen interface). In some embodiments, the input 1104 can include a variety of input devices suitable for receiving an input from the user. Examples of suitable devices include, but are not limited to, keyboard, a voice command, a proximity sensor, an ocular sensing device for determining an input based on eye movements (e.g., scrolling based on an eye movement), or the like.

The memory 104 is generally included to be representative of a random access memory (RAM) such as, but not limited to, Static Random Access Memory (SRAM), Dynamic Random Access Memory (DRAM), or Flash. In some embodiments, the memory 104 can be a volatile memory. In some embodiments, the memory 104 can be a non-volatile memory. In some embodiments, at least a portion of the memory can be virtual memory.

The storage 108 is generally included to be representative of a non-volatile memory such as, but not limited to, a hard disk drive, a solid state device, removable memory cards, optical storage, flash memory devices, network attached storage (NAS), or connections to storage area network (SAN) devices, or other similar devices that may store non-volatile data. The storage 108 can be a computer readable medium. In an embodiment, the storage 108 can include storage that is external to the computer device 10, such as in a cloud.

The network I/O 106 is configured to transmit data via the network 114. The network 114 may be referred to as the communications network 114. Examples of the network 114 include, but are not limited to, a local area network (LAN), a wide area network (WAN), the Internet, or the like. The network I/O 106 can transmit data via the network 114 through a wireless connection using Wi-Fi, Bluetooth, or other similar wireless communication protocols. The computer device 100 can transmit data via the network 114 through a cellular, 3G, 4G, 5G, or other wireless protocol.

In some embodiments, the mobile computing device 100 can run a mobile operating system such as, but not limited to, Android Operating System or the like.

Figure 2:
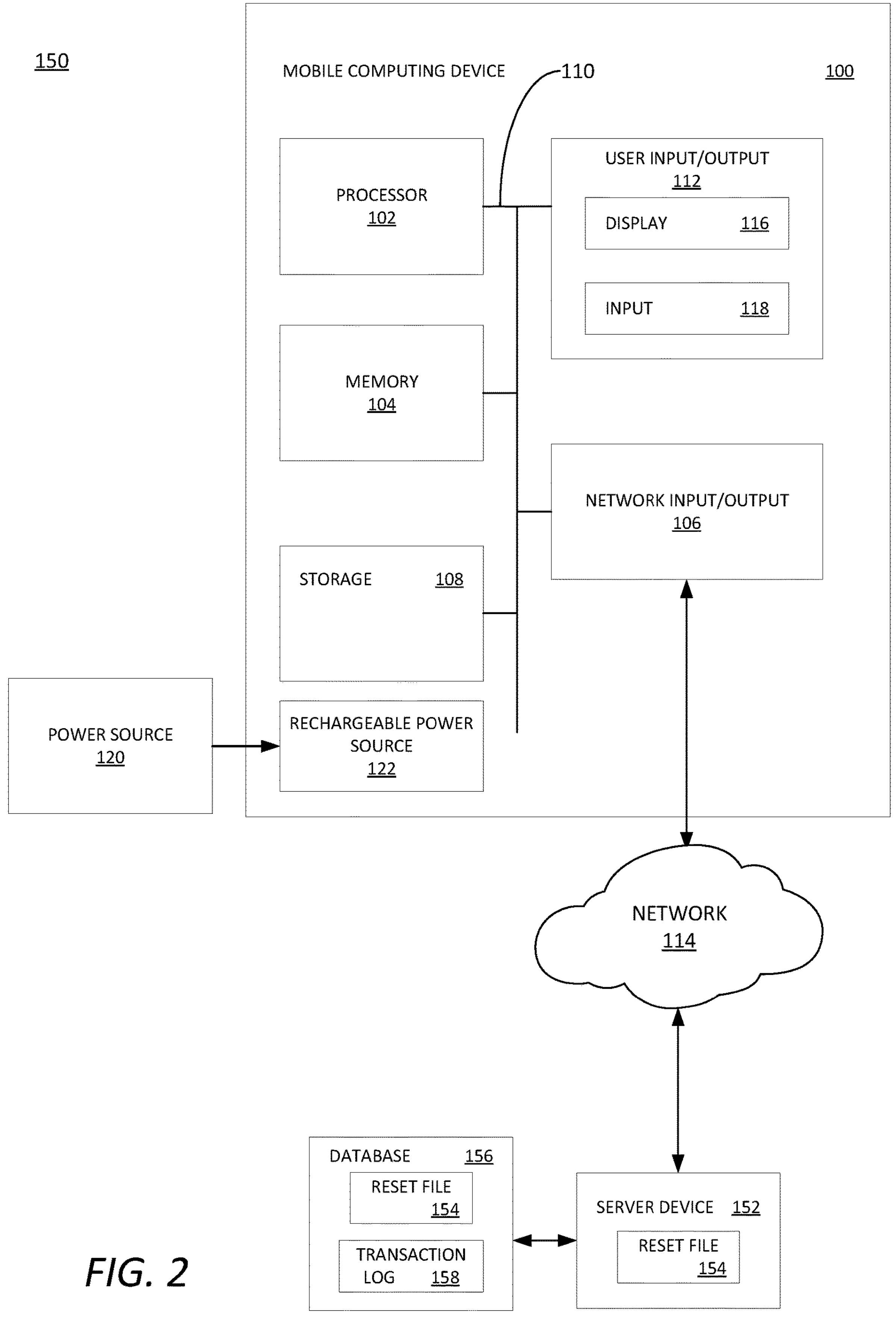
FIG. 2 shows a system for resetting a mobile computing device, according to some embodiments.

FIG. 2 shows a system 150 for resetting the mobile computing device 100 (FIG. 1), according to some embodiments.

The system 150 includes the mobile computing device 100 that can be connected in communication with a server device 152 via the network 114. In some embodiments, the mobile computing device 100 can be connected in electrical communication with a power source 120 to, for example, receive power to charge a rechargeable power source 122 on the mobile computing device 100. The server device 152 can alternatively be referred to as a server, a computing device, a server computing device, or the like. The server device 152 can be configured to store one or more reset files 154 for communication to the mobile computing device 100. For example, in some embodiments, the server device 152 can be configured to receive a request from the mobile computing device 100 for a file and the server device 152 can output the corresponding reset file 154 via the network 114 to the mobile computing device 100 for execution on the mobile computing device 100. In some embodiments, the reset file 154 can be, for example, in an Android Package Kit (APK) file format. It is to be appreciated that this file type is an example and that other file types can be utilized in accordance with the remaining disclosure herein. In some embodiments, the reset files 154 may not be stored locally on the server device 152 but can be stored in a database 156 or data store connected in communication with the server device 152.

In some embodiments, the mobile computing device 100 can be configured to request the reset file 154 from the server device 152 via the network 114. In some embodiments, the server device 152 can send the requested reset file to the mobile computing device 100 via the network 114 for installation on the mobile computing device 100. In some embodiments, the requested reset file can step an operator through a reset process. In some embodiments, the reset process can be the method 200 shown and described in accordance with FIG. 3 below. In some embodiments, the server device 152 can also receive information from the mobile computing device 100 during the reset process to, for example, maintain a transaction log 158. In some embodiments, the transaction log 158 can be maintained by a computing device other than the server device 152.

Figure 3:
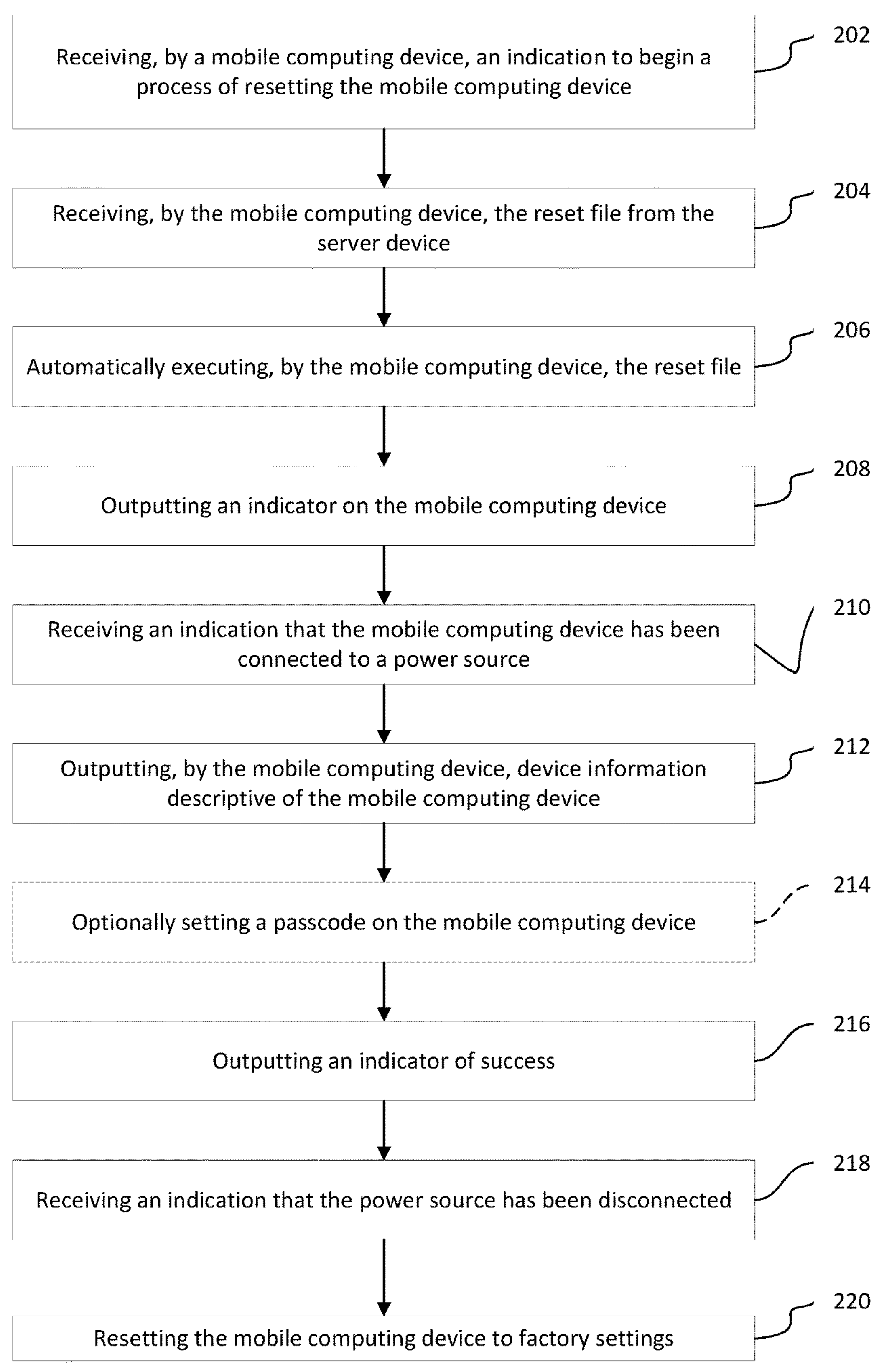
FIG. 3 shows a method for resetting a mobile computing device, according to some embodiments.

FIG. 3 shows a method 200 for resetting a mobile computing device, according to some embodiments. In some embodiments, the method 200 can be performed without connecting the mobile computing device via a hardwired connection to a test station (e.g., personal computer or the like).

In some embodiments, the method 200 can be performed using the mobile computing device 100 (FIG. 1) and the server device 152 (FIG. 2).

At block 202, the method 200 includes receiving, by the mobile computing device 100, an indication to begin a process of resetting the mobile computing device 100. In some embodiments, the indication can be received using an input device of the mobile computing device 100 such as, but not limited to, a camera of the mobile computing device 100. For example, in some embodiments, a code such as, but not limited to, a bar code, a QR code, or the like can be scanned using the camera of the mobile computing device 100. In response to the capturing of the code, the mobile computing device 100 can decode the information and move to block 204. In some embodiments, the code can be scanned by another component of the mobile computing device 100. For example, in some embodiments, a near field communication (NFC) device such as, but not limited to, an NFC tag or the like, can be electronically scanned by the mobile computing device 100 to move to block 204. In some embodiments, a user may enter a website or other address into a browser of the device to move to block 204.

At block 204, the method 200 includes receiving, from the server device 152, the reset file 154. At block 204 the mobile computing device 100 can receive the reset file 154 from the server device 152 via the network 114. In some embodiments, the reset file 154 can be an APK file executable by the mobile computing device 100.

At block 206, the method 200 includes executing the reset file 154 as received from the server device 152. In some embodiments, the processor 102 is configured to execute the reset file 154 as received from the 152. In some embodiments, the reset file 154 can be executed by the processor 102 automatically after being received on the mobile computing device 100.

At block 208, the method 200 includes outputting an indicator on the mobile computing device 100. In some embodiments, the indicator can include an instruction displayed on the display 118 of the mobile computing device 100. In some embodiments, the indicator can be an instruction requesting a user to connect the mobile computing device 100 to the power source 120. In some embodiments, the mobile computing device 100 may check to see whether the power source 120 is already connected before outputting the indicator. In some embodiments, if the power source 120 is already connected, the indicator may be a display to the user indicating that the method 200 is in process.

At block 210, the method 200 includes receiving an indication that the mobile computing device 100 has been connected to the power source 120. In some embodiments, following the block 208 output of the indicator, the mobile computing device 100 may monitor for a connection of the power source 120. In some embodiments, if the power source 120 is already connected, the mobile computing device 100 can move directly to block 212.

At block 212, the method 200 includes outputting, by the mobile computing device 100, device information about the mobile computing device 100. In some embodiments, the processor 102 of the mobile computing device 100 can read information descriptive of the particular mobile computing device 100. For example, in some embodiments, the processor 102 can determine a manufacturer of the mobile computing device 100, a model of the mobile computing device 100, an International Mobile Equipment Identity (IMEI) number, combinations thereof, or the like. In some embodiments, the device information about the mobile computing device 100 is output from the processor 102 of the mobile computing device 100 via the network 114 to the server device 152 for storage in the transaction log 158 of the database 156. In some embodiments, the device information can be output from the processor 102 of the mobile computing device 100 via the network 114 to a computing device other than the server device 152. The device information can be added to, for example, the transaction log 158 for keeping track of the mobile computing devices 100 that go through the method 200.

Optionally, at block 214, the method 200 includes setting a passcode on the mobile computing device 100. In some embodiments, before the mobile computing device 100 is reset, the reset file 154 can cause a passcode to be set on the mobile computing device 100 to prevent the release of customer information that may be on the mobile computing device 100. In some embodiments, the passcode can be randomly generated. In some embodiments, a portion of the passcode can be randomly generated. In some embodiments, the passcode can be preset and stored in the reset file 154.

At block 216, the method 200 includes outputting an indication of success. In some embodiments, the indication of success can be, for example, showing a green screen. In some embodiments, if the process has not succeeded, then a different indication can be output, such as a red screen instead of the green screen. In some embodiments, instead of or in addition to coloring the display, a message or other notification can be displayed. In some embodiments, to be able to display the success indication, the method 200 can include an identification of the current power level of the battery onboard the mobile computing device 100. For example, in some embodiments, if the power level is below a certain threshold (e.g., 3%), the error indication may be displayed. In some embodiments, instead of an error indication, the display may indicate that the mobile computing device 100 should remain connected to the power source. In some embodiments, once the threshold charge is reached, the error indication can be changed to the success indication.

At block 218, the method 200 includes receiving an indication that the power source 120 has been disconnected.

At block 220, the method 200 includes performing a factory reset of the mobile computing device 100 and rebooting the mobile computing device 100. In response to determining the power source has been disconnected, the mobile computing device 100 can be reset to factory settings and rebooted. Since the trigger for performing the factory reset includes disconnecting the mobile computing device 100 from the power source, once the mobile computing device 100 reboots, the operator may know that the mobile computing device 100 has been successfully reset and can be set aside.

Figure 4:
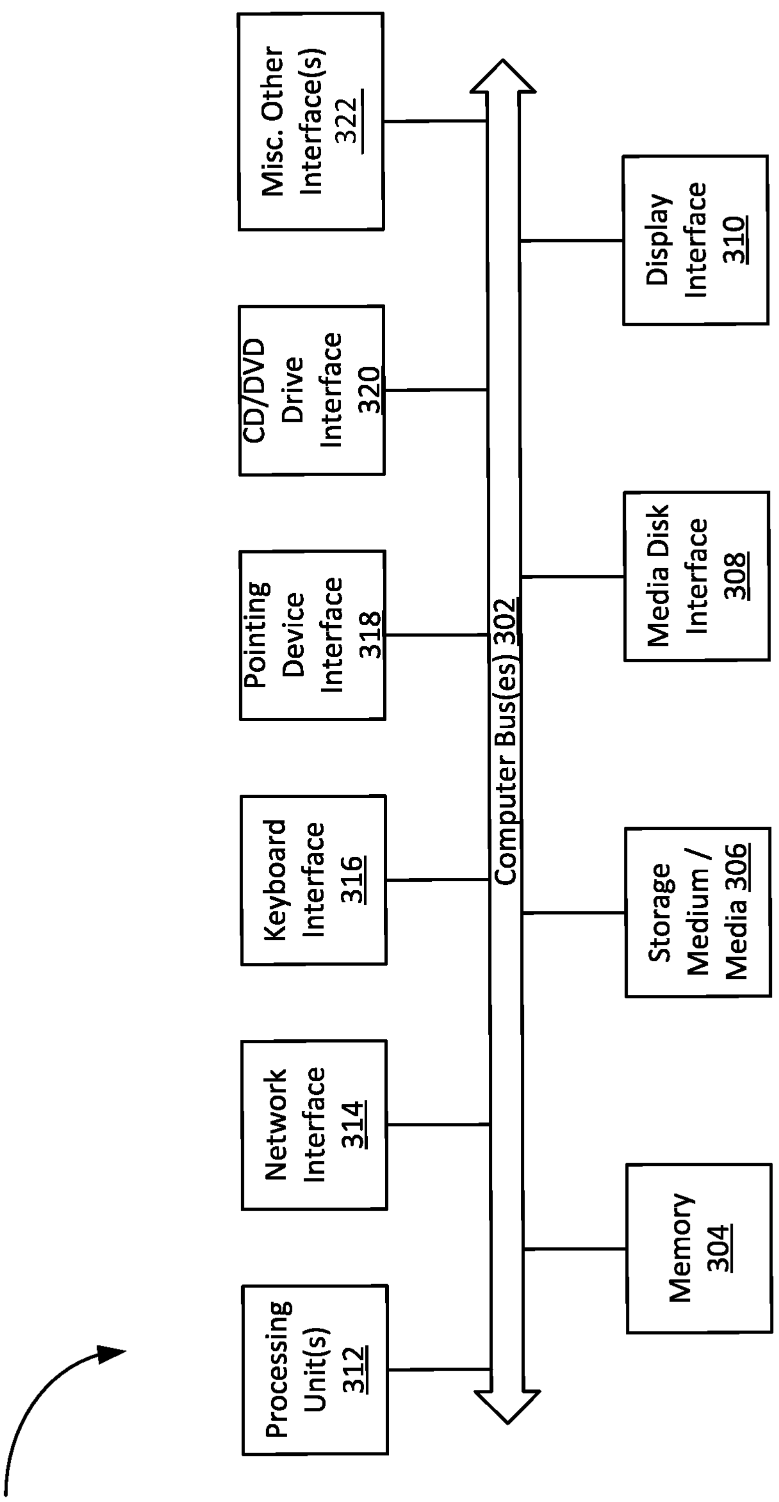
FIG. 4 is a block diagram illustrating an internal architecture of an example of a computer, according to some embodiments.

FIG. 4 is a block diagram illustrating an internal architecture 300 of an example of a computer, such as the server device 152 (FIG. 2), according to some embodiments. A computing device as referred to herein refers to any device with a processor capable of executing logic or coded instructions, and could be a server, personal computer, set top box, smart phone, pad computer or media device, to name a few such devices. As shown in the example of FIG. 4, internal architecture 300 includes one or more processing units (also referred to herein as CPUs) 312, which interface with at least one computer bus 302. Also interfacing with computer bus 302 are persistent storage medium/media 306, network interface 314, memory 304, e.g., random access memory (RAM), run-time transient memory, read only memory (ROM), etc., media disk drive interface 308 as an interface for a drive that can read and/or write to media including removable media such as floppy, CD ROM, DVD, etc. media, display interface 310 as interface for a monitor or other display device, keyboard interface 316 as interface for a keyboard, pointing device interface 318 as an interface for a mouse or other pointing device, CD/DVD drive interface 320, and miscellaneous other interfaces 322 not shown individually, such as parallel and serial port interfaces, a universal serial bus (USB) interface, and the like.

Memory 304 interfaces with computer bus 302 to provide information stored in memory 304 to CPU 312 during execution of software programs such as an operating system, application programs, device drivers, and software modules that comprise program code, and/or computer executable process operations, incorporating functionality described herein, e.g., one or more of process flows described herein. CPU 312 first loads computer executable process operations from storage, e.g., memory 304, storage medium/media 306, removable media drive, and/or other storage device. CPU 312 can then execute the stored process operations in order to execute the loaded computer-executable process operations. Stored data, e.g., data stored by a storage device, can be accessed by CPU 312 during the execution of computer-executable process operations.

Persistent storage medium/media 306 is a computer readable storage medium(s) that can be used to store software and data, e.g., an operating system and one or more application programs. Persistent storage medium/media 306 can also be used to store device drivers, such as one or more of a digital camera driver, monitor driver, printer driver, scanner driver, or other device drivers, web pages, content files, playlists and other files. Persistent storage medium/media 306 can further include program modules and data files used to implement one or more embodiments of the present disclosure.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers or be loaded and executed by one or more servers. One or more modules may be grouped into an engine or an application.

Examples of non-transitory computer-readable storage media include, but are not limited to, any tangible medium capable of storing a computer program for use by a programmable processing device to perform functions described herein by operating on input data and generating an output. A computer program is a set of instructions that can be used, directly or indirectly, in a computer system to perform a certain function or determine a certain result. Examples of non-transitory computer-readable storage media include, but are not limited to, a floppy disk; a hard disk; a random access memory (RAM); a read-only memory (ROM); a semiconductor memory device such as, but not limited to, an erasable programmable read-only memory (EPROM), an electrically erasable programmable read-only memory (EEPROM), Flash memory, or the like; a portable compact disk read-only memory (CD-ROM); an optical storage device; a magnetic storage device; other similar device; or suitable combinations of the foregoing.

While this disclosure has described certain embodiments, it will be understood that the claims are not intended to be limited to these embodiments except as explicitly recited in the claims. On the contrary, the instant disclosure is intended to cover alternatives, modifications, and equivalents, which may be included within the spirit and scope of the disclosure. Furthermore, in the detailed description of the present disclosure, numerous specific details are set forth to provide a thorough understanding of the disclosed embodiments. However, it will be obvious to one of ordinary skill in the art that systems and methods consistent with this disclosure may be practiced without these specific details. In other instances, well known methods, procedures, components, and circuits have not been described in detail as not to unnecessarily obscure various aspects of the present disclosure.

Some portions of the detailed descriptions of this disclosure have been presented in terms of procedures, logic blocks, processing, and other symbolic representations of operations on data bits within a computer or digital system memory. These descriptions and representations are the means used by those skilled in the data processing arts to convey the substance of their work most effectively to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic data capable of being stored, transferred, combined, compared, and otherwise manipulated in a computer system or similar electronic computing device. For reasons of convenience, and with reference to common usage, such data is referred to as bits, values, elements, symbols, characters, terms, numbers, or the like, with reference to various presently disclosed embodiments. It should be borne in mind, however, that these terms are to be interpreted as referencing physical manipulations and quantities and are merely convenient labels that should be interpreted further in view of terms commonly used in the art. Unless specifically stated otherwise, as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers, or other such information storage, transmission, or display devices as described herein or otherwise understood to one of ordinary skill in the art.

In some embodiments, a system includes a server device connected to a network, the server device including a processor and a memory, wherein the processor is configured to: receive a request for a reset file from a mobile computing device over the network; output the reset file to the mobile computing device, wherein the reset file is in an Android Package Kit file format; receive device information from the mobile computing device; and store the device information as received in a transaction log database.

In some embodiments, the system further includes a near field communication (NFC) device, wherein the NFC device is configured to communicate with the mobile computing device.

In some embodiments, in response to the mobile computing device communicating with the NFC device, the mobile computing device is configured to request the reset file from the server device via the network.

In some embodiments, the system further includes a database in communication with the server device, wherein the device information is configured to be stored in the database.

In some embodiments, the server device is configured to receive a plurality of requests from a plurality of mobile computing devices.

In some embodiments, the reset file includes instructions that cause the mobile computing device to be reset to factory settings.

In some embodiments, the mobile computing device includes a camera; and wherein the mobile computing device is configured to capture a code to request the reset file from the server device.

In some embodiments, a method includes outputting, from a mobile computing device, a request to obtain a reset file from a server device connected in communication with the mobile computing device via a network; receiving, by the mobile computing device, the reset file from the server device; automatically executing, by the mobile computing device, the reset file; in response to receiving an indication that the mobile computing device is connected to a power source, outputting, by the mobile computing device, device information descriptive of the mobile computing device; and resetting the mobile computing device to factory settings.

In some embodiments, the method further includes setting a passcode on the mobile computing device prior to resetting the mobile computing device to factory settings.

In some embodiments, the method further includes outputting an indicator on a display of the mobile computing device instructing an operator to connect the mobile computing device to a power source.

In some embodiments, the reset file is in an Android Package Kit file format.

In some embodiments, the method further includes receiving a communication from a near field communication (NFC) device to initiate the outputting, from the mobile computing device, the request to obtain the reset file from the server device connected in communication with the mobile computing device via the network.

In some embodiments, the method further includes decoding a code to initiate the outputting, from the mobile computing device, the request to obtain the reset file from the server device connected in communication with the mobile computing device via the network, wherein the code is captured by a camera of the mobile computing device.

In some embodiments, the method further includes receiving an indication that the mobile computing device has been removed from the power source prior to the resetting the mobile computing device to factory settings.

In some embodiments, the method further includes displaying an indicator on the display of the mobile computing device in response to determining a power level of the mobile computing device is less than a threshold amount.

In some embodiments, a method includes receiving, by a server device, a request for a reset file from a mobile computing device over a network; outputting the reset file from the server device to the mobile computing device, wherein the reset file is in an Android Package Kit file format; receiving, by the server device, device information from the mobile computing device; and storing the device information as received in a transaction log database.

In some embodiments, the reset file includes instructions that cause the mobile computing device to be reset to factory settings.

In some embodiments, the mobile computing device includes a camera; and wherein the mobile computing device is configured to capture a code to request the reset file from the server device.

In some embodiments, a near field communication (NFC) device is configured to communicate with the mobile computing device.

In some embodiments, in response to the mobile computing device communicating with the NFC device, the mobile computing device is configured to request the reset file from the server device via the network.

What is claimed is:

1. A system comprising:

a server device connected to a network, the server device comprising a processor and a memory, wherein the processor is configured to:

receive a request for a reset file from a mobile computing device over the network, wherein the mobile computing device does not have a file for resetting itself upon the request for the reset file being received at the server device;

output the reset file to the mobile computing device, wherein the reset file is in an Android Package Kit file format;

receive device information from the mobile computing device; and store the device information as received in a transaction log database.

2. The system of claim 1, further comprising a near field communication (NFC) device, wherein the NFC device is configured to communicate with the mobile computing device.

3. The system of claim 2, wherein in response to the mobile computing device communicating with the NFC device, the mobile computing device is configured to request the reset file from the server device via the network.

4. The system of claim 1, further comprising a database in communication with the server device, wherein the device information is configured to be stored in the database.

5. The system of claim 1, wherein the server device is configured to receive a plurality of requests from a plurality of mobile computing devices.

6. The system of claim 1, wherein the reset file includes instructions that cause the mobile computing device to be reset to factory settings.

7. The system of claim 1, wherein the mobile computing device includes a camera; and wherein the mobile computing device is configured to capture a code to request the reset file from the server device.

8. A method comprising:

outputting, from a mobile computing device while the mobile computing device does not have a file for resetting itself, a request to obtain a reset file from a server device connected in communication with the mobile computing device via a network;

receiving, by the mobile computing device, the reset file from the server device;

automatically executing, by the mobile computing device, the reset file;

in response to receiving an indication that the mobile computing device is connected to a power source, outputting, by the mobile computing device, device information descriptive of the mobile computing device; and resetting the mobile computing device to factory settings.

9. The method of claim 8, further comprising setting a passcode on the mobile computing device prior to resetting the mobile computing device to factory settings.

10. The method of claim 8, further comprising outputting an indicator on a display of the mobile computing device instructing an operator to connect the mobile computing device to a power source.

11. The method of claim 8, wherein the reset file is in an Android Package Kit file format.

12. The method of claim 8, further comprising receiving a communication from a near field communication (NFC) device to initiate the outputting, from the mobile computing device, the request to obtain the reset file from the server device connected in communication with the mobile computing device via the network.

13. The method of claim 8, further comprising decoding a code to initiate the outputting, from the mobile computing device, the request to obtain the reset file from the server device connected in communication with the mobile computing device via the network, wherein the code is captured by a camera of the mobile computing device.

14. The method of claim 8, further comprising receiving an indication that the mobile computing device has been removed from the power source prior to the resetting the mobile computing device to factory settings.

15. The method of claim 14, further comprising displaying an indicator on the display of the mobile computing device in response to determining a power level of the mobile computing device is less than a threshold amount.

16. A method comprising:

receiving, by a server device, a request for a reset file from a mobile computing device over a network, wherein the mobile computing device does not have a file for resetting itself upon the request for the reset file being received at the server device;

outputting the reset file from the server device to the mobile computing device, wherein the reset file is in an Android Package Kit file format;

receiving, by the server device, device information from the mobile computing device; and storing the device information as received in a transaction log database.

17. The method of claim 16, wherein the reset file includes instructions that cause the mobile computing device to be reset to factory settings.

18. The method of claim 16, wherein the mobile computing device includes a camera; and wherein the mobile computing device is configured to capture a code to request the reset file from the server device.

19. The method of claim 16, wherein a near field communication (NFC) device is configured to communicate with the mobile computing device.

20. The method of claim 19, wherein in response to the mobile computing device communicating with the NFC device, the mobile computing device is configured to request the reset file from the server device via the network.

* * * * *